(12) United States Patent
Nezaki

(10) Patent No.: US 8,016,318 B2
(45) Date of Patent: Sep. 13, 2011

(54) VEHICLE OCCUPANT RESTRAINT APPARATUS

(75) Inventor: Takuya Nezaki, Mizunami (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/489,689

(22) Filed: Jun. 23, 2009

(65) Prior Publication Data
US 2009/0322067 A1    Dec. 31, 2009

(30) Foreign Application Priority Data

Jun. 27, 2008 (JP) .................. 2008-168573

(51) Int. Cl.
*B60R 21/18* (2006.01)
(52) U.S. Cl. .............. 280/733; 280/801.1; 280/807; 280/808
(58) Field of Classification Search .......... 280/730.2, 280/733, 801.1, 802, 807, 808
See application file for complete search history.

(56) References Cited

U.S. PATENT DOCUMENTS

| | | | | |
|---|---|---|---|---|
| 6,139,111 | A * | 10/2000 | Pywell et al. ................. | 297/484 |
| 6,305,713 | B1 * | 10/2001 | Pywell et al. ................. | 280/801.1 |
| 6,336,656 | B1 * | 1/2002 | Romeo ......................... | 280/733 |
| 6,375,270 | B1 * | 4/2002 | Sullivan et al. ................ | 297/484 |
| 6,705,641 | B2 * | 3/2004 | Schneider et al. ............. | 280/733 |
| 6,769,716 | B2 * | 8/2004 | Rouhana et al. ............... | 280/806 |
| 6,773,075 | B2 * | 8/2004 | Rouhana et al. ............... | 297/484 |
| 6,811,186 | B1 * | 11/2004 | Fraley et al. .................. | 280/801.2 |
| 7,011,241 | B2 * | 3/2006 | Godshaw et al. ............... | 224/674 |
| 7,364,199 | B2 * | 4/2008 | Elizondo et al. ............... | 280/801.1 |
| 7,625,048 | B2 * | 12/2009 | Rouhana et al. ............... | 297/484 |
| 7,665,761 | B1 * | 2/2010 | Green et al. ................... | 280/733 |
| 2002/0043839 | A1 | 4/2002 | Hirota | |
| 2003/0168837 | A1 * | 9/2003 | Schneider et al. ............. | 280/733 |

FOREIGN PATENT DOCUMENTS

| | | |
|---|---|---|
| JP | 02279434 A | 11/1990 |
| JP | 05076913 U | 10/1993 |
| JP | 2000016237 A | 1/2000 |
| JP | 2000016238 | 1/2000 |
| JP | 2002002347 A | 1/2002 |
| JP | 2006096168 A | 4/2006 |

* cited by examiner

*Primary Examiner* — Toan C To
(74) *Attorney, Agent, or Firm* — Gifford, Krass, Sprinkle, Anderson & Citkowski, P.C.

(57) ABSTRACT

A vehicle occupant restraint apparatus includes: a retracting device that retracts one end side of a webbing for restraining an occupant so that the webbing can be withdrawn; a webbing holding portion that holds the other end side of the webbing; and a fixing member to which the retracting device and the webbing holding portion are attached.

18 Claims, 9 Drawing Sheets

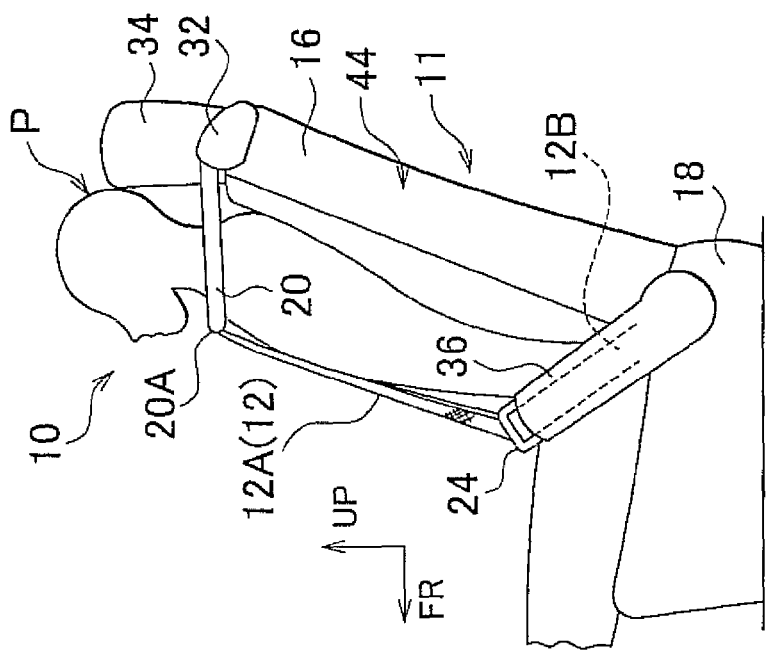
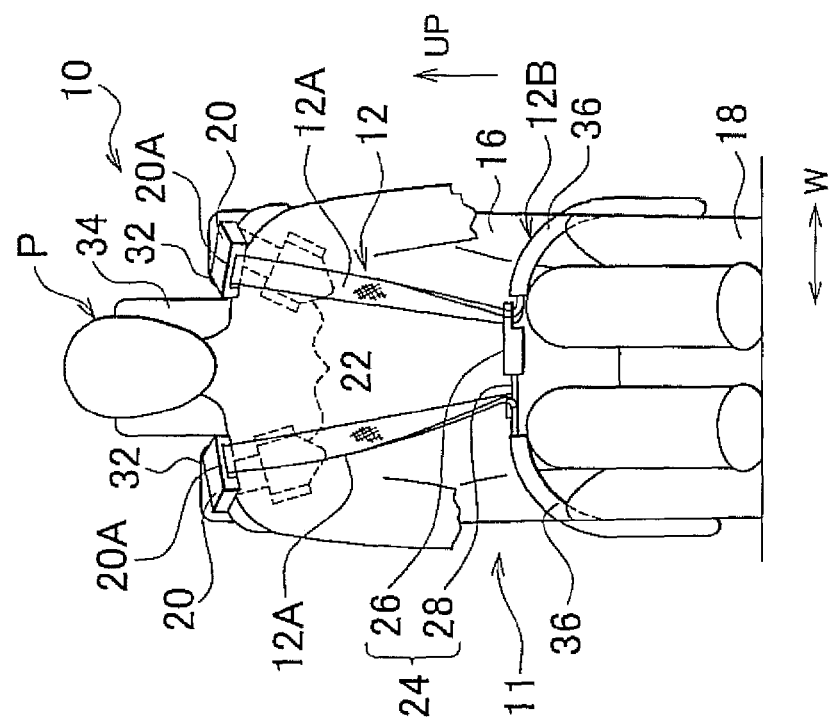

F I G . 7
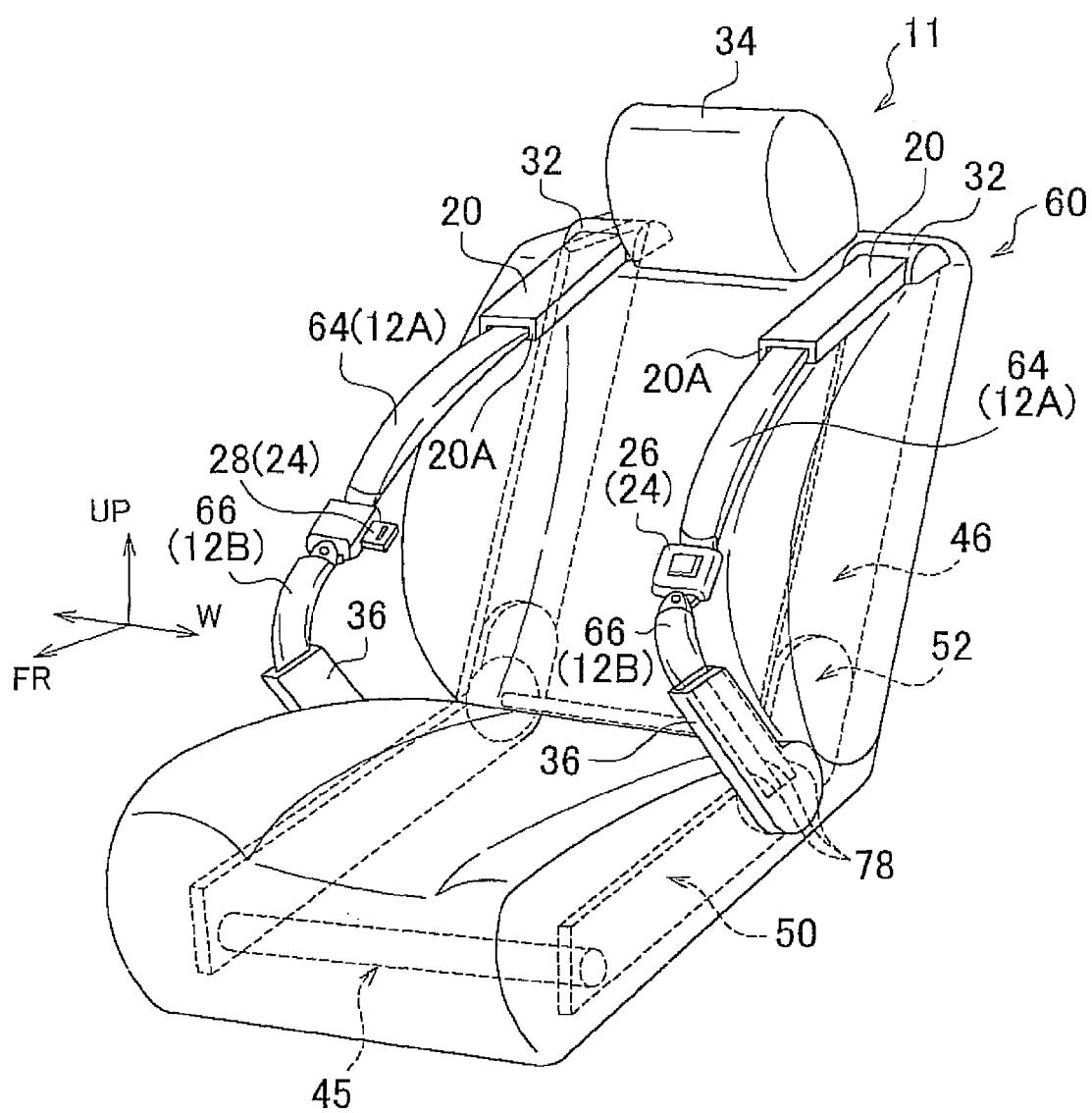

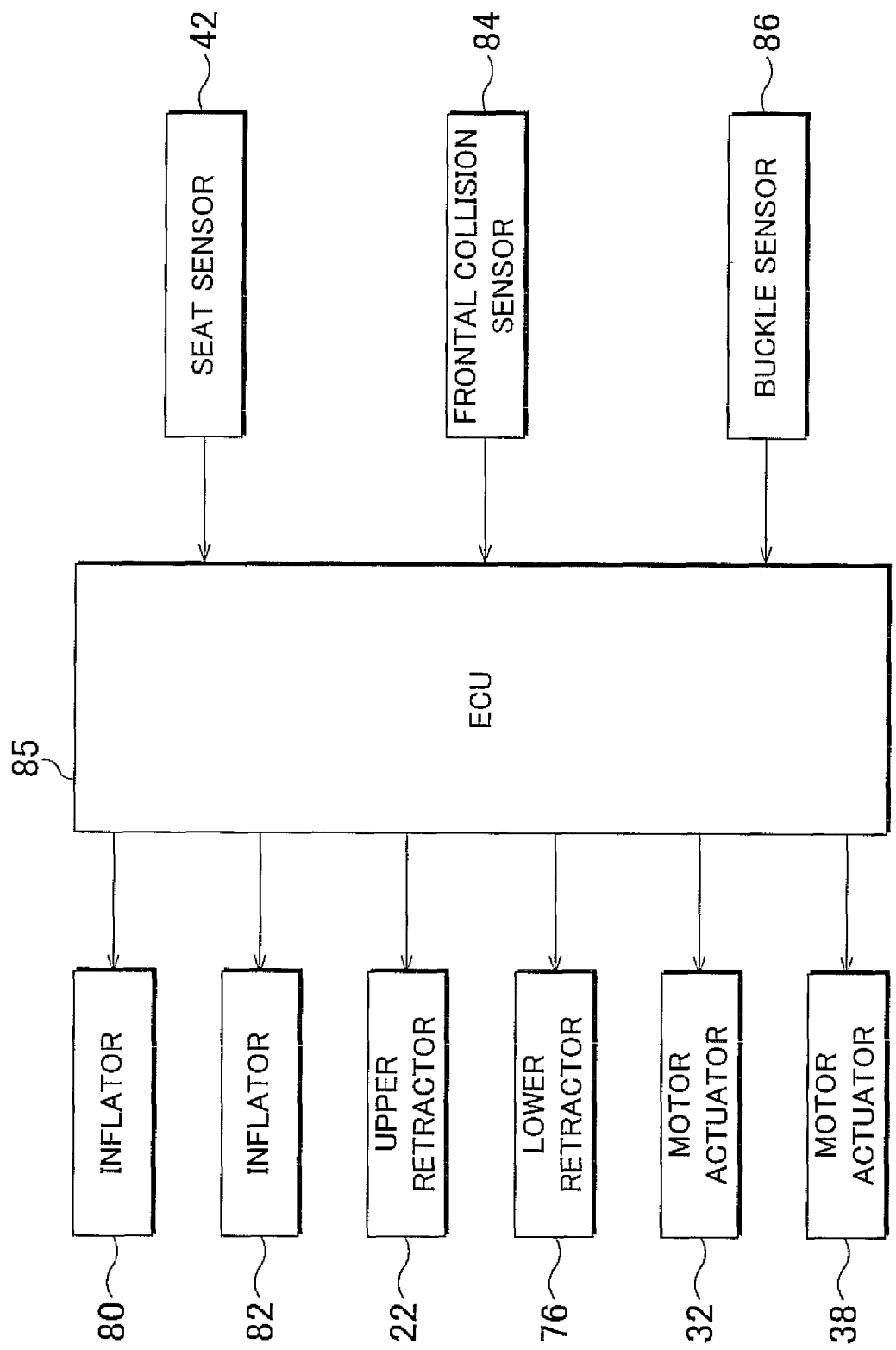

VEHICLE OCCUPANT RESTRAINT APPARATUS

INCORPORATION BY REFERENCE

The disclosure of Japanese Patent Application No. 2008-168573 filed on Jun. 27, 2008, including the specification, drawings and abstract is incorporated herein by reference in its entirety.

BACKGROUND OF THE INVENTION

1. Field of the Invention

The invention relates to a vehicle occupant restraint apparatus that restrains a seated occupant to the seat in the event of a collision.

2. Description of the Related Art

Japanese Utility Model Application Publication No. 5-76913 (JP-U-5-76913) describes a seat-integrated three-point seat belt. In the seat-integrated three-point seat belt, a retractor that retracts one end of webbing is fixed to the seat back frame via a bracket, a shoulder anchor is fixed to the seat back frame via a separate bracket from that of the retractor, a lower anchor that anchors the other end of the webbing is fixed to a transversely outer side of a seat cushion frame, and a buckle is fixed to a transversely inner side of the seat cushion frame via an inner belt.

However, in the above technique, components that constitute the seat belt are separately fixed to the seat frame, so there are many restrictions on design of a seat. In terms of this point, there is still a room for improvement.

SUMMARY OF THE INVENTION

The invention provides a vehicle occupant restraint apparatus that increases the degree of freedom of design of a vehicle seat in which the vehicle occupant restraint apparatus is installed.

A first aspect of the invention provides a vehicle occupant restraint apparatus. The vehicle occupant restraint apparatus includes: a retracting device that retracts one end side of a webbing for restraining an occupant so that the webbing can be withdrawn; a webbing holding portion that holds the other end side of the webbing; and a fixing member to which the retracting device and the webbing holding portion are attached.

With the vehicle occupant restraint apparatus according to the first aspect of the invention, the retracting device and the webbing holding portion that respectively support both ends of the webbing are fixed to the common fixing member. Thus, the retracting device, the webbing holding portion and the fixing member may be unitized (assembled) before being attached to the vehicle seat. That is, in the vehicle occupant restraint apparatus, components (portions) may be collectively attached to the vehicle seat using the intervening fixing member. Thus, it is not necessary to separately provide mounting portions, mounting spaces or mounting paths at the vehicle seat side like the configuration that the components are separately fixed to the vehicle seat. This reduces restrictions on the design of the vehicle seat.

In this way, in the vehicle occupant restraint apparatus according to the first aspect of the invention, it is possible to improve the degree of freedom of design of the vehicle seat to which the vehicle occupant restraint apparatus is installed.

The webbing may include a pair of right and left hip restraining portions for restraining a hip of the occupant; a pair of right and left upper body restraining portions for restraining an upper body of the occupant, wherein lower end sides of the pair of right and left upper body restraining portions are respectively connected to the pair of right and left hip restraining portions; an engaging portion that is provided between any one set of the right hip restraining portion and right upper body restraining portion or the left hip restraining portion and left upper body restraining portion; and an engaged portion that is provided between the other one set of the right hip restraining portion and right upper body restraining portion or the left hip restraining portion and left upper body restraining portion, wherein the engaging portion can be engaged with or disengaged from the engaged portion.

With the above vehicle occupant restraint apparatus, by engaging the engaging portion of the webbing with the engaged portion of the webbing, the right and left hip restraining portions are worn on the hip of the occupant in series with each other, while the right and left upper body restraining portions are worn on the upper body of the occupant in parallel with each other. That is, the vehicle occupant restraint apparatus includes a four-point seat belt (is based on a four-point seat belt) for restraining the occupant by the right and left hip restraining portions and the right and left upper body restraining portions. With the vehicle occupant restraint apparatus, a four-point seat belt that tends to have a large number of components may be installed to the vehicle seat using the fixing member that is attached to the vehicle seat.

The fixing member may be formed so that a first member fixed to a seat cushion frame is connected to a second member fixed to a seat back frame.

With the above vehicle occupant restraint apparatus, a seat frame is reinforced by the fixing member. In other words, a load input to the vehicle seat via the webbing is distributed and supported by the fixing member. Therefore, the vehicle occupant restraint apparatus is able to reduce restrictions on strength of the vehicle seat to which the vehicle occupant restraint apparatus is applied. Note that the first member and the second member may be directly connected to each other, or may be connected via, for example, a recliner, or the like, so that the first member and the second member can be rotated relative to each other (and can maintain selected relatively rotated positions).

The fixing member may include a cover member that covers a back surface side of a seat back.

With the above vehicle occupant restraint apparatus, it is possible to simplify the configuration with reduced exclusive components.

The vehicle occupant restraint apparatus may further include an inflatable portion that is provided for the webbing, wherein the inflatable portion is supplied with gas to inflate and deploy into a predetermined shape to protect the occupant; and a gas supply device that is provided for the fixing member, wherein the gas supply device is activated to supply gas to the inflatable portion.

With the above vehicle occupant restraint apparatus, an air belt device that tends to have a large number of components may be installed to the vehicle seat using the fixing member that is attached to the vehicle seat.

As described above, the vehicle occupant restraint apparatus according to the aspect of the invention has an advantageous effect that it is possible to improve the degree of freedom of design of a vehicle seat to which the vehicle occupant restraint apparatus is installed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1A and FIG. 1B are views that show a vehicle seat belt apparatus according to a first embodiment of the invention, in which FIG. 1A is a perspective view that shows an assembly of the vehicle seat belt apparatus before being installed in a vehicle seat, and FIG. 1B is a perspective view that shows a seat back board of the vehicle seat belt apparatus;

FIG. 4A and FIG. 4B are a front view and a side view, each of which shows the webbing of the vehicle seat belt apparatus according to the first embodiment when worn by an occupant;

FIG. 7 is a perspective view that shows the vehicle occupant restraint apparatus according to the second embodiment when installed in the vehicle seat;

FIG. 9 is a block diagram that shows a control system, and the like, of an ECU that constitutes the vehicle occupant restraint apparatus according to the second embodiment.

DETAILED DESCRIPTION OF EMBODIMENTS

Figure 1:
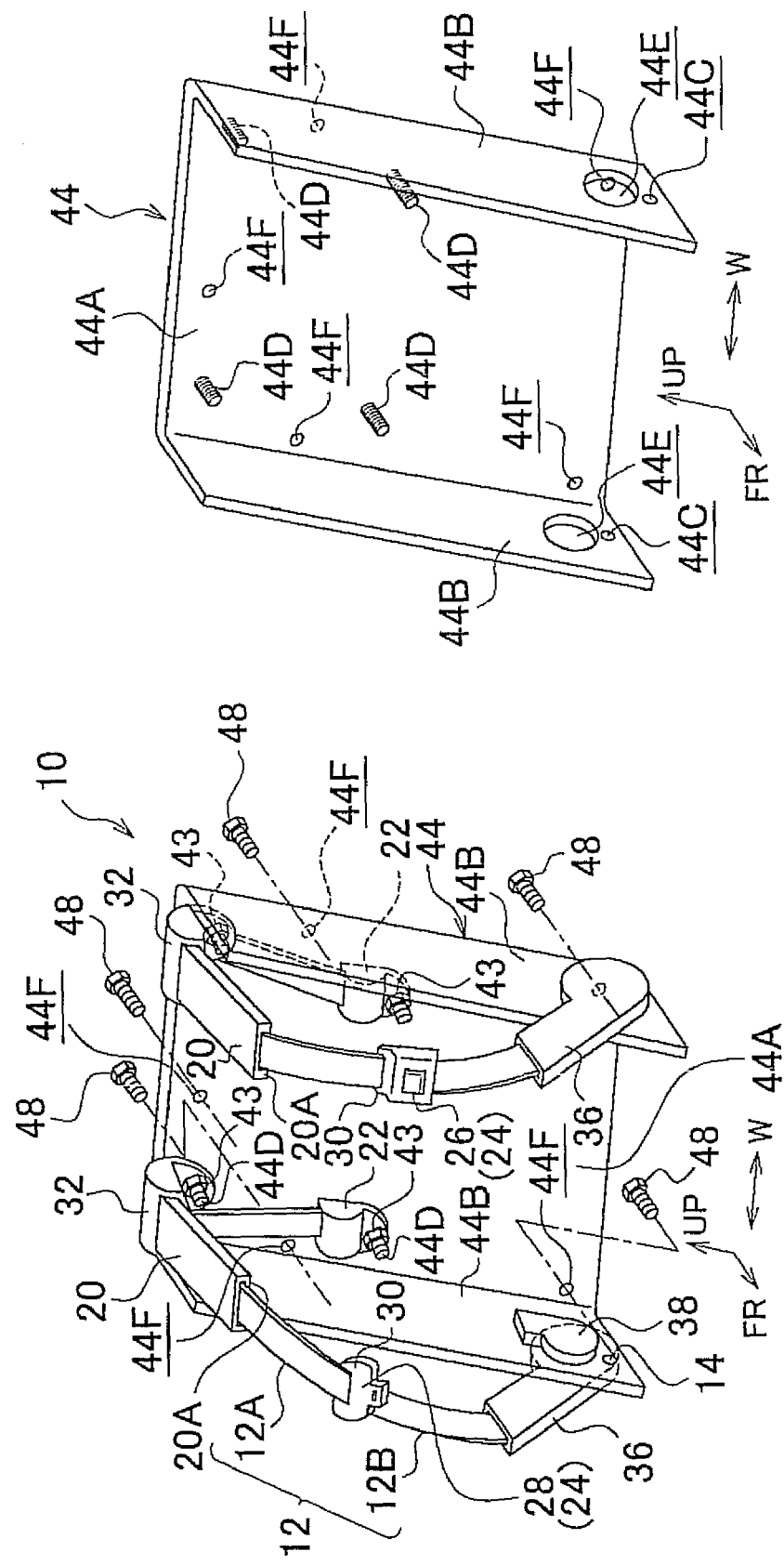

A vehicle seat belt apparatus 10, which serves as a vehicle occupant restraint apparatus, according to a first embodiment of the invention will be described with reference to FIG. 1A to FIG. 5. First, a schematic of the overall configuration (mainly, portions related to functions) of the vehicle seat belt apparatus 10 will be described, and, thereafter, a mounting structure of the vehicle seat belt apparatus 10 to a vehicle seat 11 will be described. Note that the arrow FR, the arrow UP and the arrow W shown in the drawings respectively indicate the forward direction, upward direction and vehicle width direction of a vehicle equipped with the vehicle seat belt apparatus 10. These substantially correspond to the forward direction, upward direction and vehicle width direction of a vehicle seat 11 in which the vehicle seat belt apparatus 10 is installed.

Figure 3A:
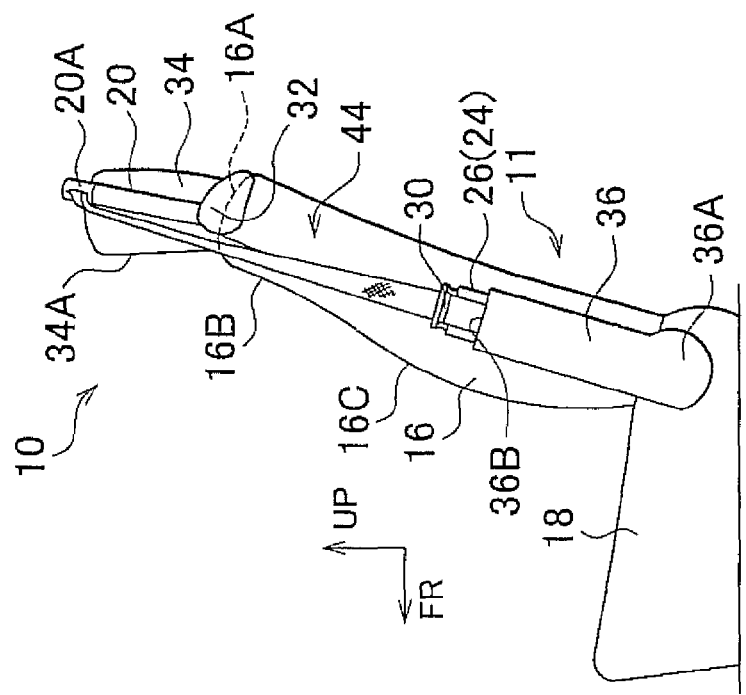
FIG. 3A and FIG. 3B are a front view and a side view, respectively, each of which shows the vehicle seat in which the vehicle seat belt apparatus according to the first embodiment is applied when unoccupied.
Figure 3B:
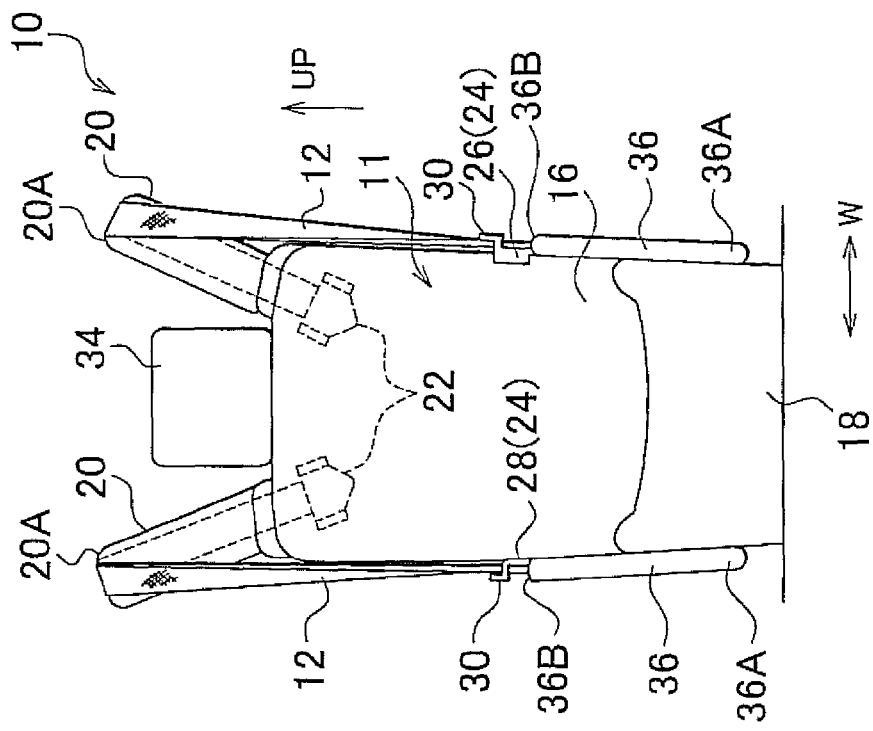
Figure 5:
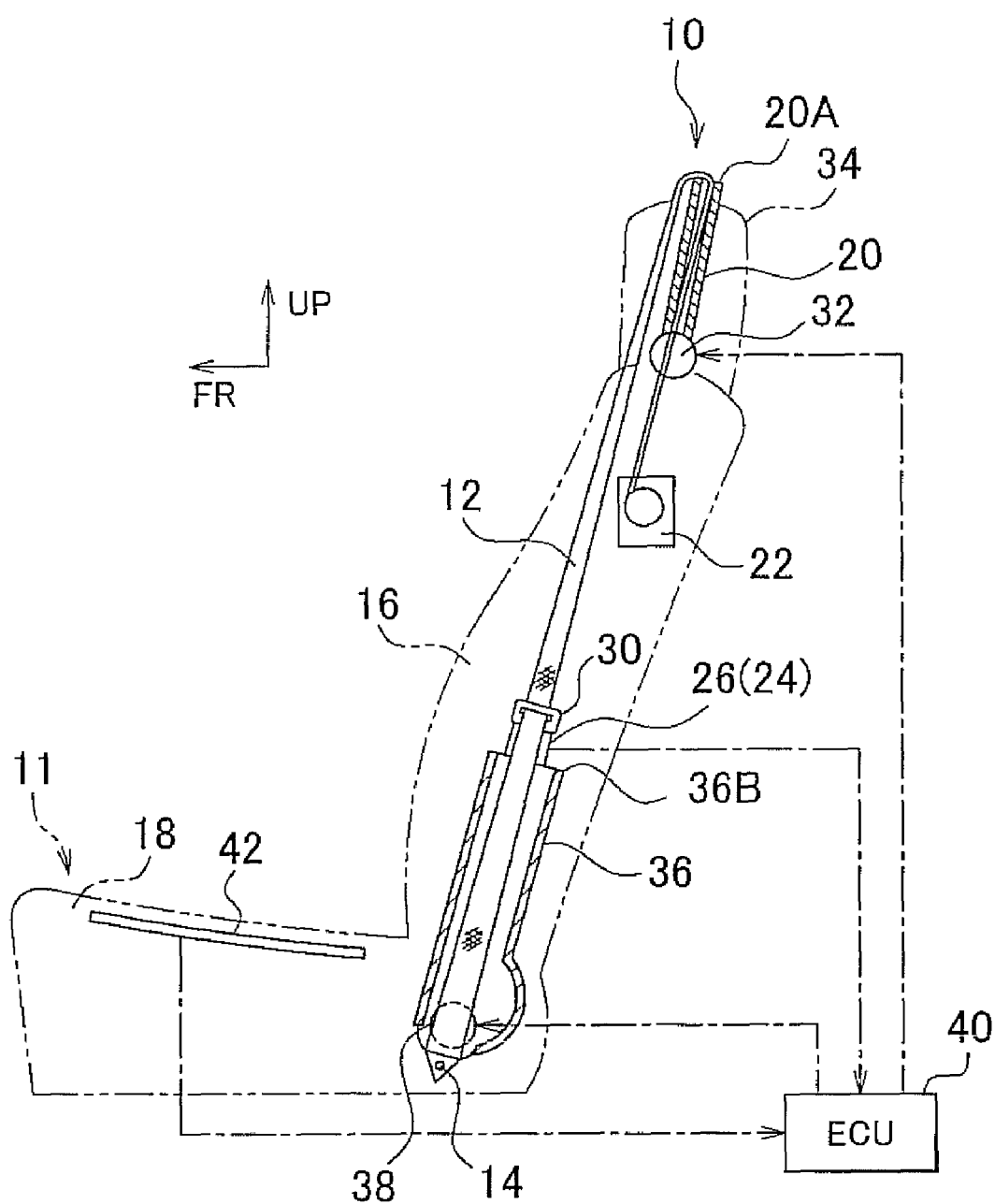
FIG. 5 is a side cross-sectional view that schematically shows the internal structure of the vehicle seat belt apparatus according to the first embodiment.

FIG. 3A is a front view of the vehicle seat 11 and the vehicle seat belt apparatus 10 in a state where an occupant is not seated. FIG. 3B is a side view of the vehicle seat 11 and the vehicle seat belt apparatus 10 in a state where an occupant is not seated. In addition, FIG. 4A is a front view of the vehicle seat 11 and the vehicle seat belt apparatus 10 in a state where webbings are worn by a seated occupant. FIG. 4B is a side view of the vehicle seat 11 and the vehicle seat belt apparatus 10 in a state where the webbings are worn by the seated occupant. Furthermore, FIG. 5 is a schematic side cross-sectional view of the internal structure of the vehicle seat belt apparatus 10.

As shown in these drawings, the vehicle seat belt apparatus 10 includes upper retractors 22, anchor members 14 and a seat back board 44. Each of the upper retractors 22 retracts the upper end side of a corresponding one of webbings 12 so that the webbing 12 can be withdrawn. Each of the anchor members 14 holds the lower end side of a corresponding one of the webbings 12. The upper retractors 22 and the anchor members 14 are attached to the seat back board 44, and then the seat back board 44 is fixed to the vehicle seat 11.

The vehicle seat belt apparatus 10 includes a pair of the right and left webbings 12, and is formed as a so-called four-point seat belt. As shown in FIG. 5, part of each webbing 12, exposed outside in a state where the webbing is not worn by the occupant, extends substantially in the vehicle vertical direction. The lower end of each webbing 12 is anchored (connected) to the vehicle seat 11 (lower end of the seat back board 44, which will be described later) via the anchor member 14 (see FIG. 5) so that it is angularly displaceable (it can follow a lap webbing guide 36, which will be described later) about an axis in the vehicle width direction. In this embodiment, each anchor member 14 constitutes a webbing holding portion according to the aspect of the invention.

On the other hand, the upper end sides of the pair of right and left webbings 12 are respectively turned back by shoulder webbing guides 20, which will be described later, and are retracted by the upper retractors 22, which serve as retracting devices, provided inside a seat back 16 so that the webbings 12 can be retracted or withdrawn. A pair of the right and left upper retractors 22 are provided in correspondence with the pair of right and left webbings 12, and retract the corresponding right and left webbings 12 about retracting axes that are slightly inclined in the vertical direction with respect to the vehicle width direction. Note that it is also applicable that the upper end sides of the right and left webbings 12 are retracted by a common retractor.

In addition, the vehicle seat belt apparatus 10 includes a buckle device 24, which serves as a webbing detachable device (coupling device), for detachably coupling the longitudinally middle portions of the right and left webbings 12. The buckle device 24 is formed of a buckle 26 and a tongue plate 28 as major components. The buckle 26 serves as an engaged portion provided at the longitudinally middle portion of one of the webbings 12. The tongue plate 28 serves as an engaging portion that can be engaged with or disengaged from the buckle 26.

The webbings 12 are respectively fitted inside the buckle 26 and the tongue plate 28 via slip joints 30 so that the buckle 26 and the tongue plate 28 are slidable in the longitudinal directions of the respective webbings 12. Thus, in the vehicle seat belt apparatus 10, the buckle 26 may be coupled to the tongue plate 28 while the webbings 12 are being withdrawn from the upper retractors 22. When the webbings 12 are not worn by an occupant, these buckle 26 and tongue plate 28 are held (prevented from slipping) at the upper ends of the lap webbing guides 36, which will be described later.

As shown in FIG. 4A and FIG. 4B, when the right and left webbings 12 are coupled by the buckle device 24 (worn by the occupant), the upper portions of the respective webbings 12 with respect to the buckle device 24 (slip joints 30) in the vehicle vertical direction are mainly regarded as shoulder webbings 12A, and portions of the respective webbings 12, which are formed of the lower portions with respect to the shoulder webbings 12A and the buckle device 24 and which connect the right and left anchor members 14 (which extend in the seat width direction), are mainly regarded as lap webbings 12B.

Furthermore, the vehicle seat belt apparatus 10 includes the pair of right and left shoulder webbing guides 20. As shown in FIG. 3A and FIG. 4A, the pair of right and left shoulder webbing guides 20 are provided in correspondence with the pair of right and left webbings 12. As shown in the side cross-sectional view of FIG. 5, the shoulder webbing guides 20 each have a flat pipe shape having a thin thickness in the direction of thickness of the webbing 12, in which a corresponding one of the webbings 12 is inserted. The shoulder webbing guides 20 are, for example, made of a resin material.

When the webbings are not worn by the occupant, the lower end of each shoulder webbing guide 20 in the vehicle vertical direction is pivotally supported by the upper end of the seat back 16 (seat back board 44, which will be described later) via a motor actuator 32 that constitutes a guide driving device. On the other hand, an end of each shoulder webbing guide 20, opposite to the motor actuator 32 side, is a webbing guide portion 20A at which a corresponding one of the inserted webbings 12 is turned back (wound).

Then, as the shoulder webbing guides 20 are pivoted about the drive axes of the motor actuators 32, the shoulder webbing guides 20 can be placed at retracted positions, which correspond to a first position shown in FIG. 3A and FIG. 3B, or at ready-to-wear positions (webbing worn positions), which correspond to a second position shown in FIG. 4A and FIG. 4B.

Specifically, as shown in FIG. 3A and FIG. 3B, the shoulder webbing guides 20 placed at the retracted positions are upright with respect to the upper end 16A of the seat back 16, and are inclined in front view so that the webbing guide portions 20A are located on the outer sides in the seat width direction with respect to the lower ends (motor actuator 32 sides) in the vehicle vertical direction. In this embodiment, the webbing guide portions 20A of the shoulder webbing guides 20 placed at the retracted positions are respectively located on the outer sides in the width direction of the seat back 16. Furthermore, as shown in FIG. 3B, the webbing guide portion 20A of each shoulder webbing guide 20 placed at the retracted position is arranged on the rear side in the vehicle longitudinal direction with respect to a front face 16B near the upper end of the seat back 16 and a front face 34A of a head rest 34.

On the other hand, as shown in FIG. 4A and FIG. 4B, the shoulder webbing guides 20 placed at the ready-to-wear positions are tilted with respect to the upper end 16A of the seat back 16, and the right and left webbing guide portions 20A are located within the shoulder width of the seated person P in front view, while the webbing guide portions 20A are located on the front side in the vehicle longitudinal direction with respect to the shoulders of the seated person P in side view. In addition, at the ready-to-wear positions, the webbing guide portions 20A are located on the upper side in the vehicle vertical direction with respect to the shoulders of the seated person P.

In addition, the vehicle seat belt apparatus 10 includes the pair of right and left lap webbing guides 36. Each lap webbing guide 36 has a flat pipe shape that is flat in the thickness direction (seat width direction) of the lower portion of the retracted webbing 12. As shown in FIG. 5, the lower portion of the retracted webbing 12, that is, a portion that constitutes the lap webbing 12B, is inserted in each lap webbing guide 36. As shown in FIG. 5, each lap webbing guide 36 is supported by the seat frame of the vehicle seat 11 near the lower end 36A thereof via a motor actuator 38 so that the lap webbing guide 36 is rotatable about an axis in the seat width direction with respect to the vehicle seat 11.

Then, as the lap webbing guides 36 are pivoted about the drive axes of the motor actuators 38, the lap webbing guides 36 can be placed at retracted positions, which correspond to a first position shown in FIG. 3A and FIG. 3B, or at ready-to-wear positions (webbing worn positions), which correspond to a second position shown in FIG. 4A and FIG. 4B.

Specifically, as shown in FIG. 3A and FIG. 3B, the lap webbing guides 36 placed at the retracted positions are upright (slightly inclined rearward) along the side faces of the seat back 16. That is, the lap webbing guides 36 placed at the retracted positions are arranged on the outer sides in the width direction of the seat back 16 and on the rear side in the vehicle longitudinal direction with respect to a front face 16C of the lower end of the seat back 16. On the other hand, as shown in FIG. 4A and FIG. 4B, the lap webbing guides 36 placed at the ready-to-wear positions are inclined forward so that upper ends 36B are located on the front side in the vehicle longitudinal direction with respect to the lower ends 36A.

Thus, in the vehicle seat belt apparatus 10, when the shoulder webbing guides 20 and the lap webbing guides 36 are placed at the respective retracted positions, the exposed portions of the webbings 12 are arranged on the outer sides in the width direction of the seat back 16 in front view as a whole as shown in FIG. 3A, and are arranged so as to overlap the range in which the thickness of the seat back 16 covers in side view substantially as a whole. That is, in the vehicle seat belt apparatus 10, when the shoulder webbing guides 20 and the lap webbing guides 36 are placed at the respective retracted positions, the right and left webbings 12 are respectively located on the sides of the seat back 16 and head rest 34 (in FIG. 3A, the buckle 26 and the tongue plate 28 are shown on the front side of the seat back 16 to visualize the buckle 26 and the tongue plate 28; however, these are also actually arranged on the sides of the seat back 16 as shown in FIG. 3B).

In addition, in this embodiment, the width of the upper end 16A of the seat back 16 is larger than the shoulder width of an assumed seated person P. Thus, when the shoulder webbing guides 20 are placed at the respective retracted positions, the right and left webbings 12 are respectively located on the outer sides beyond the shoulder width of the seated person P. In this way, in the vehicle seat belt apparatus 10, when the shoulder webbing guides 20 are placed at the respective retracted positions, the webbings 12 are not located in a seating space or in an entry space.

On the other hand, in the vehicle seat belt apparatus 10, when the shoulder webbing guides 20 are placed at the ready-to-wear positions, a space for placing the shoulders (upper body) of the seated person P is formed between the front face (including the front face 16B of the upper end) of the seat back 16 and the webbings 12. Then, in the vehicle seat belt apparatus 10, as the buckle 26 and tongue plate 28 of the buckle device 24 are coupled to each other in a state where the shoulders of the seated person P are placed in the above space, the webbings 12 are worn by the seated person P as shown in FIG. 4A and FIG. 4B.

In order to make it possible to shift from the retracted positions into the above ready-to-wear positions, the drive axes of the motor actuators 32 extend in a direction inclined toward at least one of the vehicle vertical direction and the vehicle longitudinal direction with respect to the seat width direction (inclined direction in which the outer ends of the driving axes of the motor actuators in the seat width direction are located on the lower sides or on the front sides with respect to the inner ends) (not shown). Each of the motor actuators 32 is able to rotate in both forward and reverse directions so that, for example, each motor actuator 32 rotates in a forward direction to displace the shoulder webbing guide 20 from the retracted position to the ready-to-wear position and rotates in a reverse direction to displace the shoulder webbing guide 20 from the ready-to-wear position to the retracted position.

In addition, in the vehicle seat belt apparatus 10, the positions of the buckle 26 and tongue plate 28 of the buckle device 24 in the vehicle vertical direction in a retracted state are maintained by the upper ends 36B of the corresponding lap webbing guides 36. Then, in the vehicle seat belt apparatus 10, when the lap webbing guides 36 are placed at the ready-to-wear positions, the buckle 26 and the tongue plate 28 reach positions at which the seated person P can easily hold the buckle 26 and the tongue plate 28 by hand. Furthermore, the lap webbing guides 36 are, for example, made of a resin material, and are flexible in the directions in which the lap webbing guides 36 are flattened. Thus, in a worn state where the buckle 26 and tongue plate 28 of the buckle device 24 are coupled to each other, as shown in FIG. 4A, the lap webbing guides 36 bend toward the seated person P to constitute part of the lap webbings 12B.

Furthermore, the vehicle seat belt apparatus 10 includes an ECU 40, which serves as a control unit. The ECU 40 controls major components of the guide driving device formed of the motor actuators 32 and the motor actuators 38. The ECU 40 is electrically connected to a seat sensor 42, which serves as a seat detector, and the motor actuators 32 and 38. Then, when the ECU 40 receives, from the seat sensor 42, a signal that indicates that the seated person P is seated on the vehicle seat 11, the ECU 40 controls the motor actuators 32 to rotate in a forward direction so that the shoulder webbing guides 20 are displaced from the retracted positions to the ready-to-wear positions.

In addition, in the vehicle seat belt apparatus 10, the ECU 40 is also electrically connected to a buckle sensor that is incorporated in the buckle device 24 (buckle 26) and at least outputs a signal that indicates that the buckle device 24 is released. Then, when the ECU 40 receives, from the buckle sensor of the buckle device 24, the signal that indicates that the buckle device 24 is released, the ECU 40 controls the motor actuators 32 to rotate in a reverse direction so that the shoulder webbing guides 20 are displaced from the ready-to-wear positions to the retracted positions.

The above described vehicle seat belt apparatus 10 may be applied to the vehicle seat 11, such as a driver seat, a front passenger seat and a rear seat (in the second row, in the third row, or in another subsequent row).

Mounting Structure of Vehicle Seat Belt Apparatus to Vehicle Seat

As shown in FIG. 1A and FIG. 1B, the vehicle seat belt apparatus 10 includes the seat back board 44, which serves as a fixing member. As shown in FIG. 2, the seat back board 44 includes a rectangular plate-like back board body 44A and side plates 44B. The back board body 44A covers the back surface side of the seat back 16. The side plates 44B extend forward from both ends of the seat back board 44 in the width direction and cover both sides of the seat back 16. Thus, the seat back board 44 may be regarded as a cover member that constitutes the vehicle seat 11.

Figure 2:
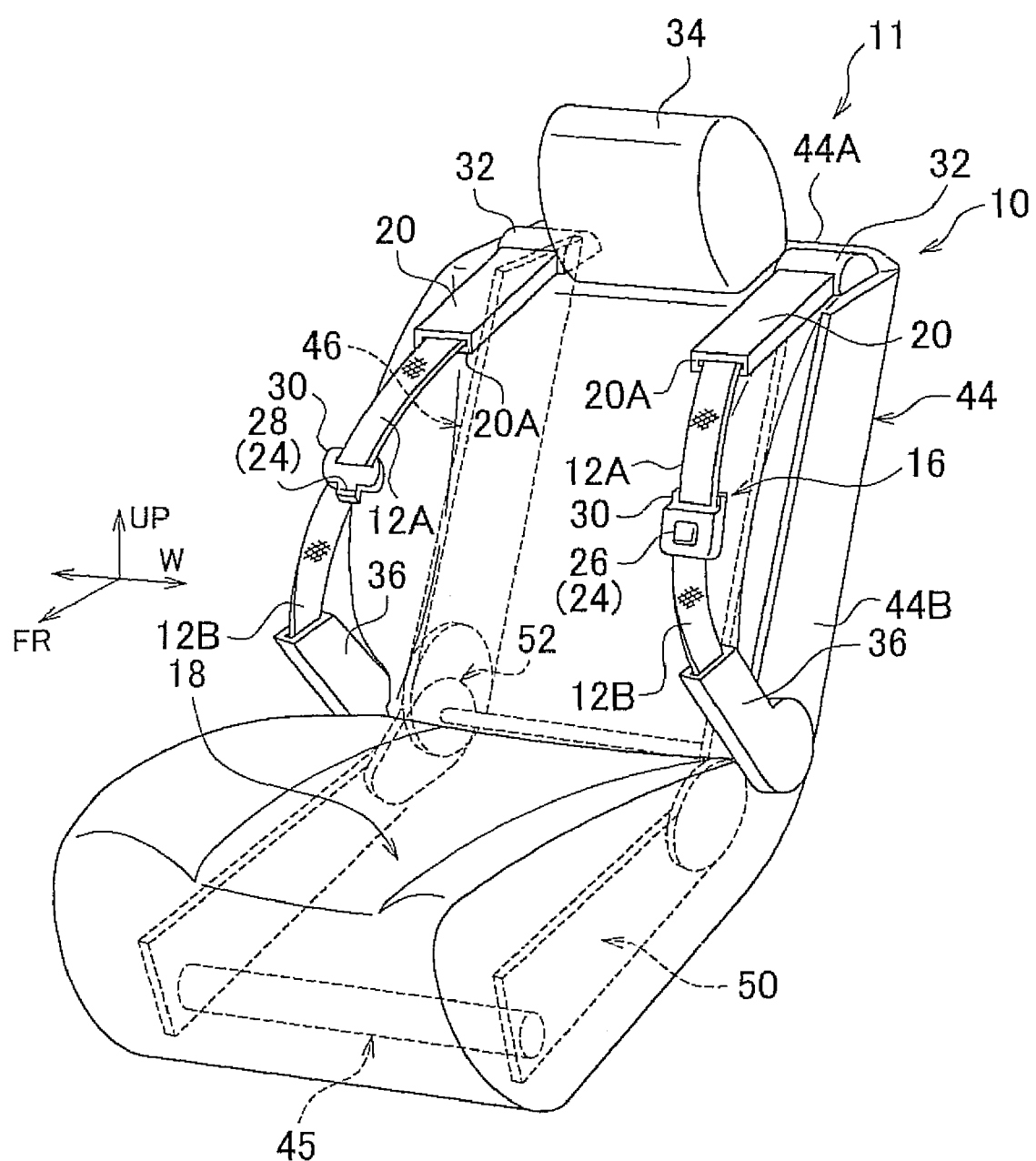
FIG. 2 is a perspective view of the vehicle seat belt apparatus according to the first embodiment when installed in the vehicle seat.

Then, as shown in FIG. 1, the anchor members 14, the upper retractors 22 (the webbings 12, and the buckle 26 and tongue plate 28 of the buckle device 24), the motor actuators 32 (the shoulder webbing guides 20) and the motor actuators 38 (the lap webbing guides 36) are fixed to the seat back board 44. Thus, the vehicle seat belt apparatus 10 may be regarded as the one in which major components, except the ECU 40, that are commonly used in a plurality of seats are subassembled (unitized) on the seat back board 44.

More specifically, the anchor members 14 are respectively fixedly provided at support holes 44C formed near the lower ends of the right and left side plates 44B. The anchor members 14 support the lower ends of the webbings 12 so that the lower ends of the webbings 12 are angularly displaceable about axes in the vehicle width direction with respect to the seat back board 44, that is, the vehicle seat 11. The right and left upper retractors 22 are fixed to the front face side of the back board body 44A by stud bolts 44D and nuts 43 so that the webbings 12 can be withdrawn from the respective upper sides of the upper retractors 22. The stud bolts 44D and the nuts 43 are provided at an upper portion of the back board body 44A, and the pairs of stud bolt 44D and nut 43 are spaced apart in the width direction.

The motor actuators 32 are fixed to the front face side of the back board body 44A by stud bolts 44D and nuts 43 so that the webbings 12 withdrawn from the corresponding right and left upper retractors 22 are inserted through the corresponding shoulder webbing guides 20. The stud bolts 44D and the nuts 43 are provided at the upper end of the back board body 44A near both ends in the width direction. The motor actuators 38 are fixed to the inner faces of the side plates 44B in the seat width direction near the anchor members 14 by screws, or the like (not shown). The rotary shafts (not shown) of the motor actuators 38 are passed through through-holes 44E, formed in the respective side plates 44B, and are coupled to the lap webbing guides 36 arranged on the outer surfaces of the side plates 44B in the seat width direction. Note that the motor actuators 38 and the anchor members 14 may be provided coaxially.

In this way, the subassembled vehicle seat belt apparatus 10 is installed to the vehicle seat 11 so as to be able to restrain an occupant in such a manner that the seat back board 44 is fixed to a seat back frame 46 (see FIG. 2) that constitutes a seat frame 45 of the seat back 16 of the vehicle seat 11. In this embodiment, bolts 48 are inserted through bolt holes 44F formed in the seat back board 44 and screwed to nuts (weld nuts, or the like) (not shown) provided for the seat back frame 46. Thus, the seat back board 44, that is, the vehicle seat belt apparatus 10, is fixedly attached to the vehicle seat 11.

The seat back board 44 that constitutes the vehicle seat belt apparatus 10 is, for example, made of a fiber reinforced plastic (CFRP, or the like) that contains reinforced resin, such as carbon fibers, and has a sufficient strength for supporting the vehicle seat belt apparatus 10.

Note that the seat frame 45 has a seat cushion frame 50 (raising and lowering member of a height adjustor), and the lower end of the seat back frame 46 is coupled to the rear end of the seat cushion frame 50 via recliners 52. Thus, the vehicle seat 11 according to this embodiment is configured so that the inclination of the seat back 16 with respect to a seat cushion 18 is adjustable (reclinable) by the recliners 52. The seat back board 44 allows (does not interfere) reclining action of the vehicle seat 11.

Next, the operation of the first embodiment will be described.

When an occupant is not seated on the vehicle seat 11 to which the above configured vehicle seat belt apparatus 10 is applied, the right and left shoulder webbing guides 20 and lap webbing guides 36 are placed at the respective retracted positions as shown in FIG. 3A and FIG. 3B. Thus, the exposed portions of the right and left webbings 12 are respectively located on the sides of the seat back 16. That is, when an occupant is not seated on the vehicle seat 11 (before an occupant is seated on the vehicle seat 11 or after the webbings 12 are released), the webbings 12 are retracted from the entry space for an occupant. Thus, in a vehicle to which the vehicle seat belt apparatus 10 is applied, an occupant easily gets on to or off from the vehicle seat 11.

Then, in the vehicle seat belt apparatus 10, in a state where the right and left shoulder webbing guides 20 and lap webbing guides 36 are placed at the retracted positions, as an occupant sits on the vehicle seat 11, the ECU 40 receives, from the seat sensor 42, a signal that indicates that the occupant is seated. As the ECU 40 receives the signal, the ECU 40 causes the motor actuators 32 and the motor actuators 38 to rotate in a forward direction by respective predetermined amounts. Then, the right and left shoulder webbing guides 20 and lap webbing guides 36 move to the respective ready-to-wear positions.

As the shoulder webbing guides 20 move from the retracted positions to the ready-to-wear positions, the webbing guide portions 20A are displaced from the outer sides of the shoulder width of the seated person P (occupant) and the upper rear sides of the shoulders over to the range of the shoulder width of the seated person P and the upper front sides of the shoulders. Thus, in the vehicle seat belt apparatus 10, the upper portions of the exposed portions of the webbings 12 turned back by the webbing guide portions 20A (the upper ends of the exposed portions supported by the webbing guide portions 20A) are displaced from the outer sides of the shoulder width of the seated person P and the upper rear sides of the shoulders to the front sides of the shoulders of the seated person P.

In addition, as the lap webbing guides 36 move from the retracted positions to the ready-to-wear positions, the buckle 26 and tongue plate 28 held near the upper ends 36B of the lap webbing guides 36 reach the positions at which the seated person P easily holds the buckle 26 and the tongue plate 28. Then, when the seated person P couples the buckle 26 with the tongue plate 28, the webbings 12 are properly worn by the seated person P as shown in FIG. 4A and FIG. 4B. That is, the webbings 12 are worn so that the shoulder webbings 12A mainly restrain the upper body of the seated person P and the lap webbings 12B mainly restrain the hip of the seated person P.

In this way, the vehicle seat belt apparatus 10 is provided with the shoulder webbing guides 20 that may be placed at the retracted positions and at the ready-to-wear positions, so it is possible to move the webbings 12 from the outer sides of the seating space for the seated person P to the front sides of the shoulders of the seated person P. That is, it is possible to move the webbings 12 to the front sides of the shoulders without interfering (contacting) with the seated person P, and it is also possible to retract the webbings 12 from the front sides of the shoulders to the sides of the seat back 16 without interfering (contacting) with the seated person P. In addition, in the vehicle seat belt apparatus 10, the ECU 40 automatically moves the right and left shoulder webbing guides 20 from the respective retracted positions to the ready-to-wear positions on the basis of the signal from the seat sensor 42. Thus, wearing of the webbings 12 is prepared even when the seated person P does not touch the webbings 12, and the seated person can easily wear the webbings 12 only by coupling the buckle device 24. In addition, when the vehicle seat belt apparatus 10 is placed in a use position, the webbing guide portions 20A of the shoulder webbing guides 20 are located on the front sides the shoulders of the seated person P. Therefore, the webbings 12 are not wound on the shoulders of the seated person P, and the seated person P receives less tight feeling (wound feeling) due to the webbings 12.

On the other hand, when the seated person P releases the buckle device 24, a buckle release signal is input from the buckle sensor of the buckle device 24 to the ECU 40. In addition, the lap webbing guides 36 return from a bent state for forming the lap webbings 12B by their own restoring forces, and move the buckle 26 and the tongue plate 28 to the outer sides of the vehicle seat 11 in the width direction.

When the signal is input from the buckle sensor, that is, when it is assumed that the seated person P intends to get off the vehicle, the ECU 40 causes the motor actuators 32 and the motor actuators 38 to rotate in a reverse direction by respective predetermined amounts. Then, the right and left shoulder webbing guides 20 return from the respective ready-to-wear positions to the retracted positions, and the right and left lap webbing guides 36 return from the respective ready-to-wear positions to the retracted positions. As the shoulder webbing guides 20 move from the ready-to-wear positions to the retracted positions, the webbing guide portions 20A are displaced from the range of the shoulder width of the seated person P and the upper front sides of the shoulders to the outer sides of the shoulder width of the seated person P (occupant) and the upper rear sides of the shoulders. By so doing, the webbings 12 are released from the seated person P.

In this way, in the vehicle seat belt apparatus 10, when the buckle sensor detects a release of the buckle device 24, the ECU 40 causes the right and left shoulder webbing guides 20 to move from the respective ready-to-wear positions to the retracted positions. Thus, after the buckle device 24 is released, the webbings 12 are automatically released even when the seated person P does not touch the webbings 12.

Here, in the vehicle seat belt apparatus 10, the anchor members 14, the upper retractors 22 (the webbings 12 and the buckle 26 and tongue plate 28 of the buckle device 24), the motor actuators 32 (the shoulder webbing guides 20) and the motor actuators 38 (the lap webbing guides 36), which are components for achieving the above function, are installed to the vehicle seat 11 using the seat back board 44. Thus, it is not necessary to separately fix these components to the vehicle seat 11 (seat frame 45, and the like). That is, the vehicle seat belt apparatus 10 that is subassembled before being installed to the vehicle seat 11 may be installed to the vehicle seat 11. Thus, it is not necessary to separately provide mounting portions, mounting spaces or mounting paths at the vehicle seat side like the configuration that components of the vehicle seat belt apparatus are separately fixed to the vehicle seat. This reduces restrictions on the design of the vehicle seat 11 (including styling; this also applies to the following description).

In this way, in the vehicle seat belt apparatus 10 according to the first embodiment, it is possible to improve the degree of freedom of design of the vehicle seat 11 to which the vehicle seat belt apparatus 10 is installed. Particularly, a four-point seat belt tends to have a large number of components as compared with a three-point seat belt; however, the subassembled vehicle seat belt apparatus 10 as described above is able to reduce restrictions on the design of the vehicle seat 11 in the four-point seat belt. In addition, it is possible to easily install the subassembled vehicle seat belt apparatus 10 to the vehicle seat 11 that is independent of the vehicle seat belt apparatus 10.

Here, in the vehicle seat belt apparatus 10, functional components are installed to the seat back board 44, which is a member used at the vehicle seat 11 side, so it is possible to simplify the configuration of the vehicle seat belt apparatus 10 without using an exclusive component (by reducing an exclusive component) for subassembling the vehicle seat belt apparatus 10. In addition, the vehicle seat belt apparatus 10 may have a common structure for each vehicle type. Furthermore, in the vehicle seat belt apparatus 10, functional components of the seat belt are installed to the seat back board 44, so it is easy to manage delivery, inventory, and the like.

Another Embodiment

Another embodiment of the invention will be described. Like reference numerals to those of the first embodiment or the above described configuration denote like components to those of the first embodiment or the above described configuration, and the description and illustration thereof may be omitted where appropriate.

Second Embodiment

Figure 6:
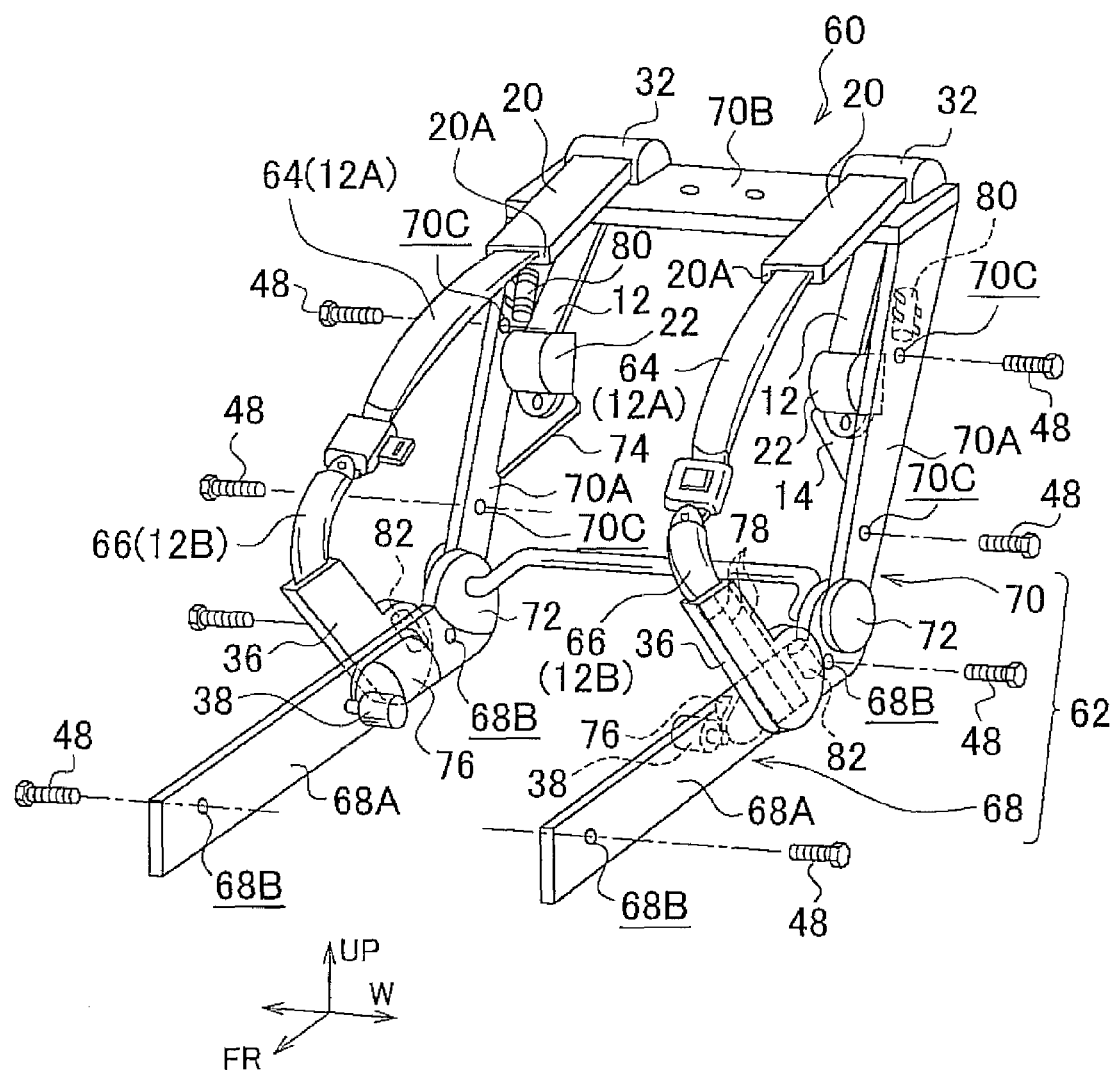
FIG. 6 is a perspective view that shows an assembly of a vehicle occupant restraint apparatus before being installed in a vehicle seat according to a second embodiment of the invention.

A vehicle occupant restraint apparatus 60 according to a second embodiment of the invention will be described with reference to FIG. 6 to FIG. 9. FIG. 6 is a perspective view that shows the vehicle occupant restraint apparatus 60 before being installed to the vehicle seat 11. FIG. 7 is a perspective view that shows the vehicle seat 11 to which the vehicle occupant restraint apparatus 60 is installed. As shown in these drawings, the vehicle occupant restraint apparatus 60 differs from the vehicle seat belt apparatus 10 in that the vehicle occupant restraint apparatus 60 is subassembled on a sub frame 62 as a fixing member instead of the seat back board 44. In addition, the vehicle occupant restraint apparatus 60 differs from the vehicle seat belt apparatus 10 according to the first embodiment in that shoulder air belts 64, which serve as inflatable portions, are provided for the shoulder webbings 12A, and lap air belts 66, which serve as inflatable portions, are provided for the lap webbings 12B. Hereinafter, the configuration will be specifically described.

The sub frame 62 is formed so that the rear end of a lower sub frame 68 and the lower end of an upper sub frame 70 are coupled via recliners 72. The lower sub frame 68 serves as a first member fixed to the seat cushion frame 50. The upper sub frame 70 serves as a second member fixed to the seat back frame 46. Specifically, the lower sub frame 68 is formed to have a pair of right and left lower side frames 68A as major components. The pair of lower side frames 68A respectively extend in the vehicle longitudinal direction. In addition, the upper sub frame 70 is formed to have a pair of right and left upper side frames 70A and an upper frame 70B as major components. The pair of upper side frames 70A respectively extend in the vehicle vertical direction. The upper frame 70B bridges the upper ends of the pair of right and left upper side frames 70A.

The sub frame 62 is fixed to the seat back frame 46 and the seat cushion frame 50. The sub frame 62 allows reclining of the vehicle seat 11 in such a manner that the rear ends of the right and left lower side frames 68A are coupled the lower ends of the corresponding upper side frames 70A via the recliners 72. As shown in FIG. 6, the sub frame 62 is configured so that bolts 48 inserted through bolt holes 68B and 70C, which are formed in the right and left lower side frames 68A and upper side frames 70A, are screwed to nuts (weld nuts, or the like) (not shown), provided for the seat back frame 46 and the seat cushion frame 50 to thereby fixedly install the sub frame 62, that is, the vehicle occupant restraint apparatus 60, to the vehicle seat 11.

In addition, the right and left upper side frames 70A that constitute the upper sub frame 70 respectively provide fixed brackets 74 so that the brackets 74 are located on the inner sides of the upper side frames 70A in the seat width direction. The corresponding upper retractors 22 are attached to the brackets 74. In addition, the motor actuators 32 are respectively attached to near both ends of the upper frame 70B of the upper sub frame 70 in the seat width direction.

On the other hand, the lap webbing guides 36 are supported by the respective right and left lower side frames 68A of the lower sub frame 68 so that the lap webbing guides 36 are pivotable about axes in the seat width direction. In this embodiment, the lower end sides of the right and left webbings 12, passing through the lap webbing guides 36, are respectively retracted to lower retractors 76, which serve as webbing holding portions, so that the webbings 12 can be retracted or withdrawn. The right and left lower retractors 76 are coupled to the lap webbing guides 36 so as to be able to follow actions of the lap webbing guides 36, and are supported by the corresponding lower side frames 68A so that the lower retractors 76 rotatable about axes in the vehicle width direction. By so doing, as the motor actuators 38 operate, both the lap webbing guides 36 and the lower retractors 76 are pivoted about axes in the vehicle width direction with respect to the lower sub frame 68.

As shown in FIG. 7, the shoulder air belts 64 are provided over the ranges from the lower ends of the shoulder webbings 12A to portions near (immediately below) the webbing guide portions 20A in a state where the shoulder webbing guides 20 and the lap webbing guides 36 are placed at the ready-to-wear positions (in a state where the shoulder webbings 12A are nearly worn by an occupant P). In addition, although not shown in the drawing, the lap air belts 66 are provided over the ranges from the inner ends in the vehicle width direction (the buckle 26 and the tongue plate 28) to the outer ends in the vehicle width direction (near the ends of the seat cushion 18 in the width direction) in a state where the lap webbings 12B are worn by the occupant. That is, part of the lap air belts 66 are arranged inside the lap webbing guides 36.

Therefore, as shown in FIG. 6 and FIG. 7, the lap webbing guides 36 in the present embodiment have tear portions 78, which serve as break starting points, for allowing the lap air belts 66 to inflate and deploy.

The shoulder air belts 64 and the lap air belts 66 are formed so that folded bag elements, which inflate and deploy with gas supplied from inflators 80 and 82 (discussed later), are respectively covered with covers having seam portions. The seam portions break as the bag elements inflate. The following description will be mainly based on the deployed shoulder air belts 64 and lap air belts 66, so the shoulder air belts 64 and the lap air belts 66 are synonymous with the above bag elements (which are hidden when not activated).

The inflators 80 for supplying gas to the shoulder air belts 64 are respectively fixed to the upper side frames 70A of the upper sub frame 70. In this embodiment, the inflators 80 are respectively provided for the right and left shoulder air belts 64. Each inflator 80 and the corresponding shoulder air belt 64 are in communication with each other via a flexible tube (not shown) arranged along the webbing 12. On the other hand, the inflators 82 for supplying gas to the lap air belts 66 are fixedly arranged inside the lap webbing guides 36. In this embodiment, the inflators 82 are respectively provided for the right and left lap air belts 66. Each inflator 82 and the corresponding lap air belt 66 are in communication with each other via a flexible tube (not shown) arranged along the webbing 12.

In this way, in the vehicle occupant restraint apparatus 60, as the inflators 80 and 82 are activated, gas is supplied to each of the right and left shoulder air belts 64 and lap air belts 66. Activation of these inflators 80 and 82 is controlled by an ECU 85, which serves as a control unit, provided instead of the ECU 40.

As shown in FIG. 9, the ECU 85 that constitutes the vehicle occupant restraint apparatus 60 is electrically connected not only to the motor actuators 32 and 38 and the seat sensor 42 but also a frontal collision sensor 84, a buckle sensor 86 and the inflators 80 and 82. The frontal collision sensor 84 detects or predicts a frontal collision of a vehicle to which the frontal collision sensor 84 is applied. The buckle sensor 86 outputs a signal that indicates that the buckle 26 and the tongue plate 28 are coupled to each other. The ECU 85 activates the inflators 80 and 82 when the ECU 85 determines, on the basis of a signal from the buckle sensor 86, that the buckle 26 and the tongue plate 28 are coupled to each other, and determines, on the basis of a signal from the frontal collision sensor 84, that a frontal collision has occurred or is unavoidable.

Figure 8:
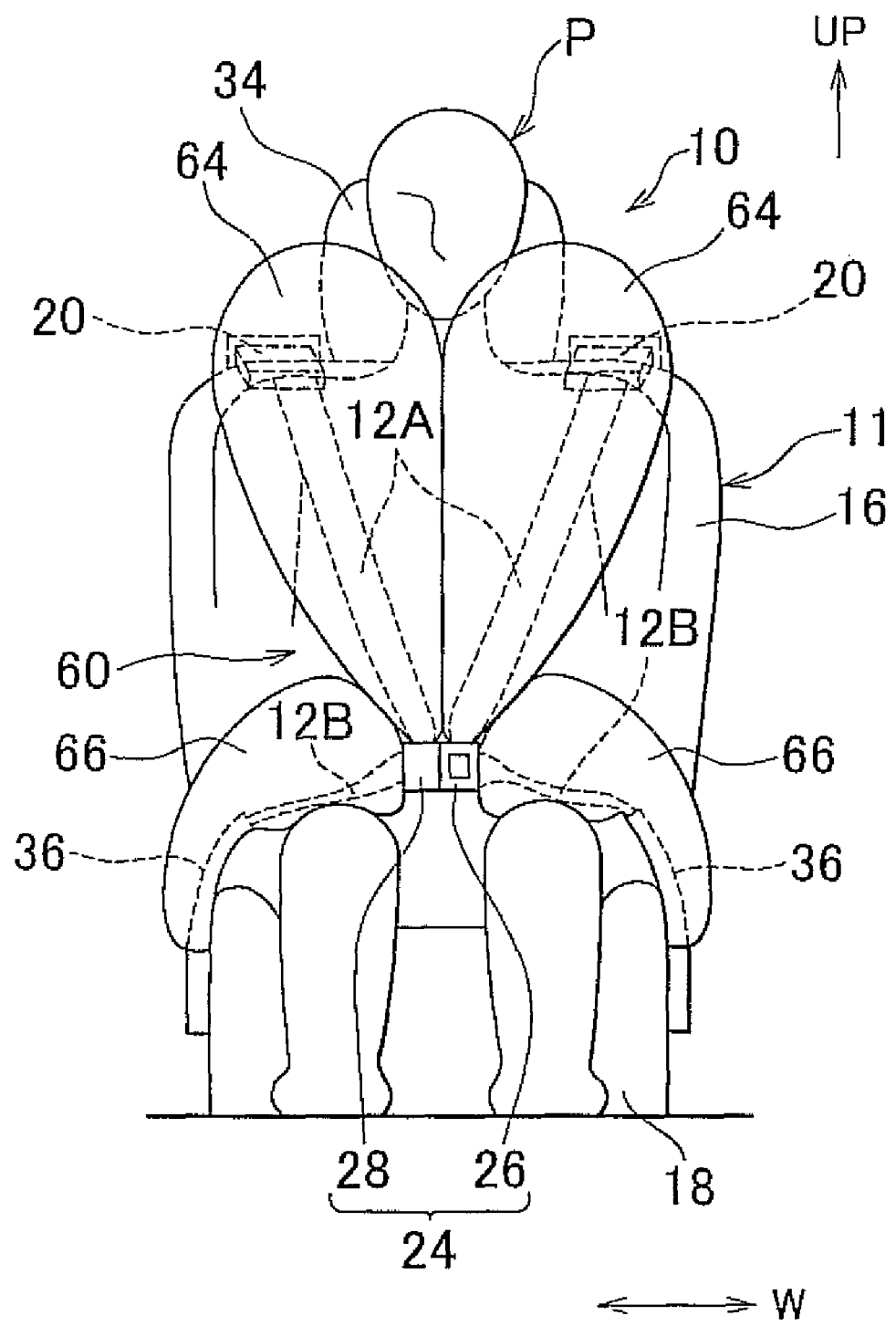
FIG. 8 is a front view that shows the vehicle occupant restraint apparatus according to the second embodiment when the air belts are deployed.

As described above, in the vehicle occupant restraint apparatus 60, in the event of a frontal collision of a vehicle to which the shoulder air belts 64 are applied, the shoulder air belts 64 inflate in front of the upper body of the occupant P as shown in FIG. 8 with gas supplied from the inflators 80 and deploy into predetermined shapes. By so doing, the vehicle seat belt apparatus 10 effectively protects the upper body of the seated person P with the shoulder air belts 64 in the event of a frontal collision. In addition, in the event of a frontal collision, the lap air belts 66 inflate and deploy in front of and sides of the hip of the occupant P with gas supplied from the inflators 82. By so doing, the vehicle seat belt apparatus 10 firmly restrains the hip of the occupant P to the vehicle seat 11 with the lap air belts 66 in the event of a frontal collision.

In addition, in this embodiment, the ECU 85 is electrically connected to the upper retractors 22 and the lower retractors 76. Then, the ECU 85 activates a pretensioner device provided for each of the upper retractors 22 and lower retractors 76 when the ECU 85 determines, on the basis of a signal from the buckle sensor 86 (buckle ON signal), that the buckle 26 and the tongue plate 28 are coupled to each other, and determines, on the basis of a signal from the frontal collision sensor 84, that a frontal collision has occurred or is unavoidable (when the ECU 85 receives a frontal collision signal).

Next, the difference of the operation of the vehicle occupant restraint apparatus 60 according to the second embodiment from the operation of the vehicle seat belt apparatus 10 according to the first embodiment will be mainly described.

In the above configured vehicle occupant restraint apparatus 60, as the occupant P seated on the vehicle seat 11 couples the buckle 26 with the tongue plate 28, the pair of right and left shoulder webbings 12A are worn on the upper body of the occupant P, and the pair of right and left lap webbings 12B are worn on the hip of the occupant.

When the ECU 85 receives a buckle ON signal from the buckle sensor 86 and a frontal collision signal from the frontal collision sensor 84, the ECU 85 activates the inflators 80 and 82 and activates the pretensioners of the upper retractors 22 and lower retractors 76. Then, the shoulder webbings 12A and the lap webbings 12B are forcibly retracted by the upper retractors 22 and the lower retractors 76 and, therefore, the shoulder webbings 12A and the lap webbings 12B closely contact the occupant P.

In addition, gas generated by the inflators 80 and 82 is supplied to the shoulder air belts 64 and the lap air belts 66 through the corresponding flexible tubes. Thus, the right and left shoulder air belts 64 and lap air belts 66 inflate and deploy into respective predetermined shapes. By so doing, the vehicle occupant restraint apparatus 60 restrains the hip of the occupant P to the vehicle seat 11 with the lap webbings 12B and the seat back 16, and protects the upper body of the occupant P by the shoulder air belts 64 against a frontal collision in a state where the upper body of the occupant P is restrained to the vehicle seat 11 with the shoulder webbings 12A.

With the vehicle occupant restraint apparatus 60, as in the case of the vehicle seat belt apparatus 10, the webbings 12 are easily worn by the occupant P and easily released from the occupant P, and an entry space to the vehicle seat 11 is ensured.

Here, in the vehicle occupant restraint apparatus 60, the anchor members 14, the upper retractors 22 (the webbings 12 and the buckle 26 and tongue plate 28 of the buckle device 24), the motor actuators 32 (the shoulder webbing guides 20), the motor actuators 38 (the lap webbing guides 36), the lower retractors 76 and the inflators 80 and 82, which are components for achieving the above function, are installed to the vehicle seat 11 via the sub frame 62. Thus, it is not necessary to separately fix these components to the vehicle seat 11 (seat back frame 46, and the like). That is, the vehicle occupant restraint apparatus 60 that is subassembled before being installed to the vehicle seat 11 may be installed to the vehicle seat 11. Thus, it is not necessary to separately provide mounting portions, mounting spaces or mounting paths at the vehicle seat side like the configuration that components of the vehicle seat belt apparatus are separately fixed to the vehicle seat. This reduces restrictions on the design of the vehicle seat 11 (including styling; this also applies to the following description).

In this way, the vehicle occupant restraint apparatus 60 according to the second embodiment is able to improve the degree of freedom of design of the vehicle seat 11 to which the vehicle occupant restraint apparatus 60 is installed. Particularly, the vehicle occupant restraint apparatus 60 based on a four-point seat belt and provided with air belts tends to have a large number of components as compared with a three-point seat belt or the vehicle seat belt apparatus 10, or the like, with no air belt; however, with the subassembled vehicle occupant restraint apparatus 60 as described above, it is possible to reduce restrictions on the design of the vehicle seat 11 in the configuration based on the four-point seat belt and provided with air belts. In addition, it is possible to easily install the subassembled vehicle occupant restraint apparatus 60 to the vehicle seat 11 that is independent of the vehicle occupant restraint apparatus 60.

Furthermore, in the vehicle occupant restraint apparatus 60, the lower sub frame 68, which is fixed to the seat cushion frame 50, and the upper sub frame 70, which is fixed to the seat back frame 46, are coupled to form the sub frame 62. Thus, the seat frame 45 (vehicle seat 11) is reinforced by the sub frame 62. That is, with the vehicle occupant restraint apparatus 60, in the configuration that a load (support reaction force) for restraining the occupant P in the event of a frontal collision is input to the seat frame 45 via the webbings 12, part of the load is distributed and supported by the sub frame 62.

Thus, in the configuration that the vehicle occupant restraint apparatus 60 is applied to the vehicle seat 11 that has no structure for directly supporting the support reaction force from the webbings 12 at a vehicle side, it is possible to reduce restrictions on strength of the vehicle seat 11. That is, it is enough to design the vehicle seat 11, including the seat frame 45, to perform the function (including styling) as the vehicle seat 11, and the strength of the vehicle occupant restraint apparatus 60 for a required function may be ensured by the sub frame 62.

Thus, it is not necessary to exclusively design a vehicle seat that supports a load (support reaction force) for restraining an occupant primarily not at a vehicle body but at a seat side for each type of vehicle or specification, and it is easy to apply (possible to facilitate application of) the configuration for supporting the above support reaction force primarily at the seat side, to a vehicle, or the like. Particularly, it is easy to apply the configuration based on a four-point seat belt and provided with the shoulder air belts 64 and the lap air belts 66, to a vehicle, or the like. In addition, the lower sub frame 68 is coupled to the upper sub frame 70 via the recliners 72 to implement the configuration that allows reclining of the vehicle seat 11 while effectively reinforcing the seat frame 45 by the sub frame 62 (supporting a portion of an occupant restraint load).

Note that, in the above described embodiments, the vehicle seat 11 can be reclined; however, the aspect of the invention is not limited to this configuration. For example, it is needless to say that the aspect of the invention may also be applied to a seat of which the position of the seat back 16 is fixed with respect to the seat cushion 18. In this case, for example, it is only necessary that the lower sub frame 68 and the upper sub frame 70 are fixedly coupled to each other.

In addition, in the above described embodiments, the shoulder air belts 64 and the lap air belts 66 are provided only for the vehicle occupant restraint apparatus 60; however, the aspect of the invention is not limited to this configuration. For example, it is also applicable that at least one set of the shoulder air belts 64 or the lap air belts 66 is provided for the vehicle seat belt apparatus 10, or it is also applicable that at least one set of the shoulder air belts 64 or the lap air belts 66 is not provided for the vehicle occupant restraint apparatus 60. In addition, in the configuration that has at least one set of the shoulder air belts 64 or the lap air belts 66, it is also applicable that any one set of the upper retractors 22 or the lower retractors 76 is provided. In the configuration that no shoulder air belt 64 and no lap air belt 66 are provided, both the upper retractors 22 and the lower retractors 76 may be provided.

Furthermore, in the above described embodiments, the vehicle seat belt apparatus 10 or the vehicle occupant restraint apparatus 60 includes the shoulder webbing guides 20 (motor actuators 32) and the lap webbing guides 36 (motor actuators 38); however, the aspect of the invention is not limited to this configuration. For example, shoulder anchors that simply wind the webbings 12 may be provided instead of the shoulder webbing guides 20. Alternatively, for example, the configuration with no lap webbing guide 36 may also be applied.

Furthermore, the fixing member according to the aspect of the invention is not limited to the seat back board 44 or the sub frame 62, but the fixing member may be, of course, modified in various forms.

In addition, in the above described embodiments, the vehicle seat belt apparatus 10 or the vehicle occupant restraint apparatus 60 are constructed as (an extension of) a four-point seat belt having the pair of right and left shoulder webbings 12A; however, the aspect of the invention is not limited to this configuration. For example, the aspect of the invention may be applied to a three-point seat belt (the aspect of the invention does not need to consider whether an air belt is provided). That is, components that constitute a three-point seat belt may be subassembled on the seat back board 44 or the sub frame 62. In this case, for example, the buckle device provided for the webbings to engage the tongue plate is not limited to the configuration fixed to the seat back board 44 or the sub frame 62. Instead, the buckle device may be fixed to the vehicle seat 11 (seat frame 45) or may be fixed to a vehicle body.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A vehicle occupant restraint apparatus comprising:
    a retracting device that retracts one end side of a webbing for restraining an occupant so that the webbing can be withdrawn;
    a webbing holding portion that holds the other end side of the webbing; and
    a fixing member to which the retracting device and the webbing holding portion are attached, the fixing member is fixed to a frame of a vehicle seat.

2. The vehicle occupant restraint apparatus according to claim 1, wherein the fixing member is fixed to the frame of the vehicle seat from outside the vehicle seat.

3. The vehicle occupant restraint apparatus according to claim 1, wherein the webbing includes
    a pair of right and left hip restraining portions for restraining a hip of the occupant;
    a pair of right and left upper body restraining portions for restraining an upper body of the occupant, wherein lower end sides of the pair of right and left upper body restraining portions are respectively connected to the pair of right and left hip restraining portions;
    an engaging portion that is provided between any one set of the right hip restraining portion and right upper body restraining portion or the left hip restraining portion and left upper body restraining portion; and
    an engaged portion that is provided between the other one set of the right hip restraining portion and right upper body restraining portion or the left hip restraining portion and left upper body restraining portion, wherein the engaging portion can be engaged with or disengaged from the engaged portion.

4. The vehicle occupant restraint apparatus according to claim 3, wherein the engaging portion and the engaged portion are movable in a longitudinal direction of the webbing.

5. The vehicle occupant restraint apparatus according to claim 1, wherein
    the webbing includes a first webbing and a second webbing,
    the first webbing includes a first hip restraining portion for restraining a hip of the occupant; a first upper body restraining portion for restraining an upper body of the occupant, wherein a lower end side of the first upper body restraining portion is connected to the first hip restraining portion; and an engaging portion that is provided between the first hip restraining portion and the first upper body restraining portion, and
    the second webbing includes a second hip restraining portion for restraining the hip of the occupant; a second upper body restraining portion for restraining the upper body of the occupant, wherein a lower end side of the second upper body restraining portion is connected to the second hip restraining portion; and an engaged portion that is provided between the second hip restraining portion and the second upper body restraining portion, wherein the engaging portion can be engaged with or disengaged from the engaged portion.

6. The vehicle occupant restraint apparatus according to claim 1, wherein
    the fixing member supports a lower end side of the webbing so that the lower end side of the webbing is angularly displaceable about an axis in a vehicle width direction with respect to the vehicle seat.

7. The vehicle occupant restraint apparatus according to claim 1, wherein the fixing member includes a cover member that covers a back surface side of a seat back.

8. The vehicle occupant restraint apparatus according to claim 1, further comprising:
- an inflatable portion that is provided for the webbing, wherein the inflatable portion is supplied with gas to inflate and deploy into a predetermined shape to protect the occupant; and
- a gas supply device that is provided for the fixing member, wherein the gas supply device is activated to supply gas to the inflatable portion.

9. The vehicle occupant restraint apparatus according to claim 8, further comprising:
- a cover portion that covers the inflatable portion, wherein the cover portion has a seam portion that breaks as the inflatable portion inflates.

10. A vehicle seat that is provided with the vehicle occupant restraint apparatus according to claim 1.

11. A vehicle occupant restraint apparatus comprising:
- a retracting device that retracts one end side of a webbing for restraining an occupant so that the webbing can be withdrawn;
- a webbing holding portion that holds the other end side of the webbing; and
- a fixing member to which the retracting device and the webbing holding portion are attached, the fixing member is fixed to a vehicle seat, and wherein the fixing member includes a body portion that covers a back surface side of the vehicle seat and side plate portions that extend forward from both ends of the vehicle seat in a width direction and that cover both sides of the vehicle seat.

12. The vehicle occupant restraint apparatus according to claim 11, wherein the webbing includes
- a pair of right and left hip restraining portions for restraining a hip of the occupant;
- a pair of right and left upper body restraining portions for restraining an upper body of the occupant, wherein lower end sides of the pair of right and left upper body restraining portions are respectively connected to the pair of right and left hip restraining portions;
- an engaging portion that is provided between any one set of the right hip restraining portion and right upper body restraining portion or the left hip restraining portion and left upper body restraining portion; and
- an engaged portion that is provided between the other one set of the right hip restraining portion and right upper body restraining portion or the left hip restraining portion and left upper body restraining portion, wherein the engaging portion can be engaged with or disengaged from the engaged portion.

13. The vehicle occupant restraint apparatus according to claim 11, wherein
- the webbing includes a first webbing and a second webbing,
- the first webbing includes a first hip restraining portion for restraining a hip of the occupant; a first upper body restraining portion for restraining an upper body of the occupant, wherein a lower end side of the first upper body restraining portion is connected to the first hip restraining portion; and an engaging portion that is provided between the first hip restraining portion and the first upper body restraining portion, and
- the second webbing includes a second hip restraining portion for restraining the hip of the occupant; a second upper body restraining portion for restraining the upper body of the occupant, wherein a lower end side of the second upper body restraining portion is connected to the second hip restraining portion; and an engaged portion that is provided between the second hip restraining portion and the second upper body restraining portion, wherein the engaging portion can be engaged with or disengaged from the engaged portion.

14. The vehicle occupant restraint apparatus according to claim 11, further comprising:
- an inflatable portion that is provided for the webbing, wherein the inflatable portion is supplied with gas to inflate and deploy into a predetermined shape to protect the occupant; and
- a gas supply device that is provided for the fixing member, wherein the gas supply device is activated to supply gas to the inflatable portion.

15. A vehicle occupant restraint apparatus comprising:
- a retracting device that retracts one end side of a webbing for restraining an occupant so that the webbing can be withdrawn;
- a webbing holding portion that holds the other end side of the webbing; and
- a fixing member to which the retracting device and the webbing holding portion are attached, the fixing member is fixed to a vehicle seat;
- wherein the fixing member is formed so that a first member fixed to a seat cushion frame is connected to a second member fixed to a seat back frame.

16. The vehicle occupant restraint apparatus according to claim 15, wherein the webbing includes
- a pair of right and left hip restraining portions for restraining a hip of the occupant;
- a pair of right and left upper body restraining portions for restraining an upper body of the occupant, wherein lower end sides of the pair of right and left upper body restraining portions are respectively connected to the pair of right and left hip restraining portions;
- an engaging portion that is provided between any one set of the right hip restraining portion and right upper body restraining portion or the left hip restraining portion and left upper body restraining portion; and
- an engaged portion that is provided between the other one set of the right hip restraining portion and right upper body restraining portion or the left hip restraining portion and left upper body restraining portion, wherein the engaging portion can be engaged with or disengaged from the engaged portion.

17. The vehicle occupant restraint apparatus according to claim 15, wherein
- the webbing includes a first webbing and a second webbing,
- the first webbing includes a first hip restraining portion for restraining a hip of the occupant; a first upper body restraining portion for restraining an upper body of the occupant, wherein a lower end side of the first upper body restraining portion is connected to the first hip restraining portion; and an engaging portion that is provided between the first hip restraining portion and the first upper body restraining portion, and
- the second webbing includes a second hip restraining portion for restraining the hip of the occupant; a second upper body restraining portion for restraining the upper body of the occupant, wherein a lower end side of the second upper body restraining portion is connected to the second hip restraining portion; and an engaged portion that is provided between the second hip restraining portion and the second upper body restraining portion, wherein the engaging portion can be engaged with or disengaged from the engaged portion.

18. The vehicle occupant restraint apparatus according to claim 15, further comprising:
 an inflatable portion that is provided for the webbing, wherein the inflatable portion is supplied with gas to inflate and deploy into a predetermined shape to protect the occupant; and
 a gas supply device that is provided for the fixing member, wherein the gas supply device is activated to supply gas to the inflatable portion.

* * * * *